United States Patent [19]
Mirov et al.

[11] Patent Number: 5,790,890
[45] Date of Patent: Aug. 4, 1998

[54] IDENTIFICATION INTERFACE

[75] Inventors: Russell N. Mirov, Los Altos; Victor Odisho, Fremont, both of Calif.

[73] Assignee: Sun Microsystems, Inc., Mountain View, Calif.

[21] Appl. No.: 608,745

[22] Filed: Feb. 29, 1996

[51] Int. Cl.$^6$ .................................................. G06F 17/00
[52] U.S. Cl. ................................................................. 395/835
[58] Field of Search ............................. 395/828, 835, 395/836, 834, 833, 831

[56] References Cited

U.S. PATENT DOCUMENTS

| | | | |
|---|---|---|---|
| 4,750,136 | 6/1988 | Arpin | 395/835 |
| 5,237,674 | 8/1993 | Mohme et al. | 395/442 |
| 5,475,854 | 12/1995 | Thomsen et al. | 395/843 |
| 5,517,646 | 5/1996 | Piccirillo et al. | 395/830 |

FOREIGN PATENT DOCUMENTS

| | | |
|---|---|---|
| 88103609 | 3/1988 | European Pat. Off. . |
| WO 94/19750 | 9/1994 | WIPO . |

OTHER PUBLICATIONS

"Book of DS 19XX Touch Memory Standards", Dallas Semiconductor of Dallas, TX, Edition 2.1 (Jun. 1995), pp. 50–55.

*Primary Examiner*—Ellis B. Ramirez
*Attorney, Agent, or Firm*—Blakely Sokoloff Taylor & Zafman

[57] ABSTRACT

An identification interface that transfers control information between a controller and an option module coupled to a motherboard of a computer. The identification interface supports the propagation of a plurality of bit fields containing information pertaining to the characteristics of the option module including, but not limited to, its speed, type and other information about its characteristics.

22 Claims, 2 Drawing Sheets

IDENTIFICATION INTERFACE

BACKGROUND OF THE INVENTION

1. Field of the Invention

The invention relates generally to the field of computer systems. More particularly, this invention relates to an identification interface for obtaining information about an option module.

2. Description of Art Related to the Invention

Many electronic systems (e.g., computers, printers and the like) are designed with a number of circuit boards which are electrically coupled together. Typically, one of these circuit boards (i.e., the "motherboard") includes a microprocessor which executes program instructions necessary for the electronic system to perform its intended functions. In addition, the motherboard further includes a plurality of sockets to receive a number of option modules including, for example, those directed to memory (i.e., "memory" modules). This provides a communicative pathway between memory and the microprocessor. Particular examples of suitable motherboards include those motherboards of desktop computers manufactured by Sun Microsystems, Inc. of Mountain View, Calif.

One well-known type of memory module is commonly referred to as a single in-line memory module ("SIMM"). SIMMs normally contain a number of electronic memory components coupled to a rectangular shaped printed circuit board. Typically, at least one edge of the printed circuit board has a plurality of contacts that can be inserted into a corresponding socket of the motherboard. As a result, the user may upgrade his or her electronic system by merely adding SIMMs or substituting a predetermined type of SIMM for another type that may be mechanically similar but has different characteristics (i.e., faster, made by a different manufacturer, etc.).

Normally, system software running on the electronic system must be coded in a fashion to retrieve certain information about the memory module(s) in order to appropriately configure a memory controller or operating system tables. Likewise, certain information about other types of option modules would be required for configuring the electronic system at power-up. Although using system software for the above-described configuration purposes has been the chosen scheme over the last few years, it is subject to a number of disadvantages.

One disadvantage is that conventional system software imposes a few upgrade restrictions. For example, this software may be able to determine the number of SIMMs implemented and the total memory size, but it is incapable of determining the speed grade of its module and/or memory components. Thus, accidental installation of older versions of a memory module having memory components with substandard access times is not likely to be detected at power-up but rather after experiencing a data storage error.

Another disadvantage is that conventional system software fails to provide reliable electrical inventory and asset controls of the option modules without opening the chassis of the computer. Instead, for current inventory and asset management techniques, the chassis of each electronic system has to be opened and each module subsequently removed from its assigned socket. Thereafter, it is inspected by scanning a bar code or recording a serial number imprinted on the components or circuit board to the option module. This inventory and asset control procedure is costly and inefficient for larger corporations having hundreds or thousands of electronic systems.

Another disadvantage is that a wide range of option modules, for example input/output ("I/O") modules, video modules and other modules without executable code, can be inserted into a socket normally assigned to a different type of option module. Thus, the conventional system software must be coded to determine any type of option module that is accidentally or intentionally connected to one of the sockets and advise the user of any incorrect couplings.

Hence, it would be advantageous to design an interface which would electrically determine the nature and characteristics of the option card or its components without software analysis or physical analysis requiring opening of the chassis and subsequent removal of that option module.

SUMMARY OF THE INVENTION

The present invention relates to an identification interface which provides a dedicated communication path between a controller or any "master device" and a plurality of identification storage components. Each identification storage component is uniquely addressed and implemented onto its respective option card that is removably coupled to a motherboard of the computer system. The identification storage component contains a plurality of bit fields which feature characteristic information about its associated option module. Upon the controller requesting information from a selected identification storage component, the selected identification storage component transfers information thereto. System software may use this information for inventory and asset control, hardware upgrades of their products and the like.

BRIEF DESCRIPTION OF THE DRAWINGS

The features and advantages of the present invention will become apparent from the following detailed description of the present invention in which.

DESCRIPTION OF THE PREFERRED EMBODIMENT

The present invention describes an identification interface and its associated communication scheme which collectively enable transmission of data to and from a controller through a dedicated communication bus. Although numerous details of this interface and its protocol are set forth, it is obvious that these specific details are not required to practice the invention. In other instances, well known circuits, devices and the like may not be discussed to avoid obscuring the present invention.

Figure 1:
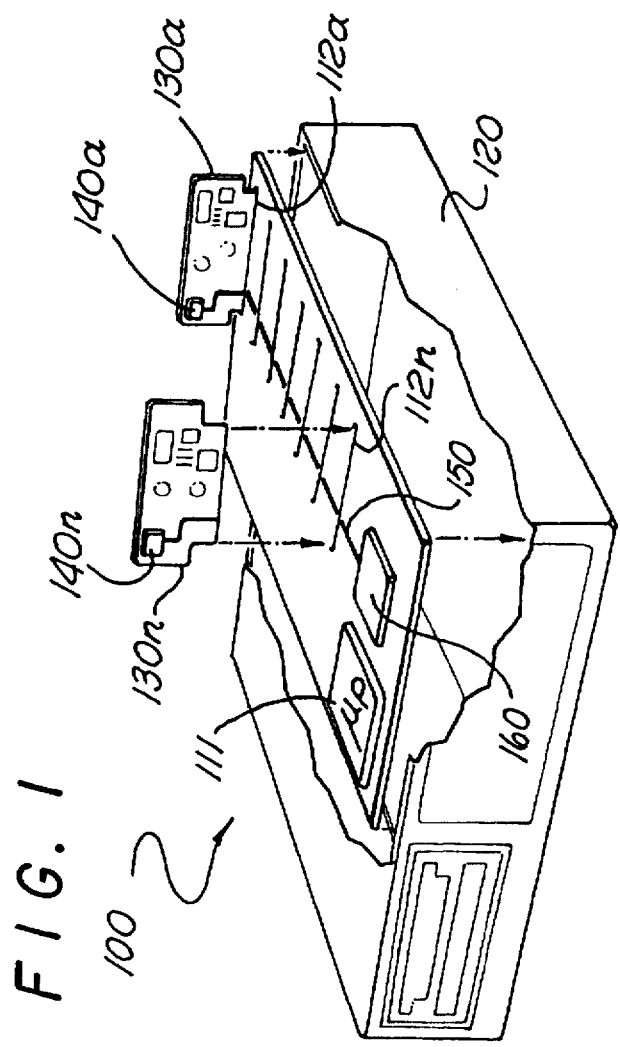
FIG. 1 is a perspective view of a computer including a number of modules coupled to the motherboard, each module is adapted with an identification storage component.

Referring to FIG. 1, a simplified embodiment of a computer utilizing the present invention is shown. The computer 100 comprises a motherboard 110 implemented within a chassis 120 of the computer. The motherboard 110 comprises a processor 111 and a plurality of sockets 112a–112n, each configured to receive a particular type of option module 130a–130n such as a SIMM, video module and the like. Each of the plurality of sockets 112a–112n will accept any type of option module that is mechanically compatible with the socket even though the components of the option module, and hence the module itself, may slightly differ than the intended function, speed, module manufacturer and other characteristics assigned to that socket.

These characteristic differences between the modules 130a–130n are ascertained by software through the implementation of an identification storage component 140a–140n onto each of the option modules 130a–130n. Preferably, each identification storage component 140a–140n is non-volatile, non-alterable memory such as read-only memory "ROM" but may be implemented as flash memory, electrically programmable ROM ("EPROM") and the like. The identification storage components 140a–140n are individually imbedded to contain information about its module as described below in FIG. 3.

Figure 2:
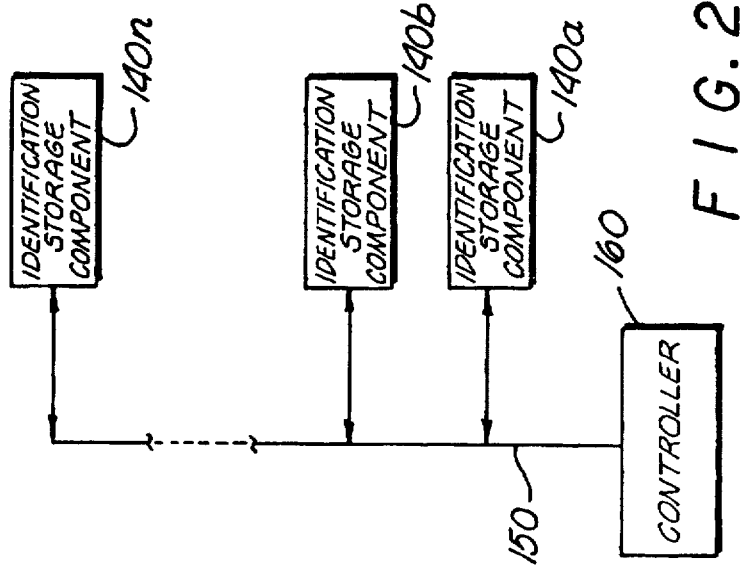
FIG. 2 is a block diagram illustrating an embodiment of the identification interface in which each of the modules includes an identification storage component which contains information pertaining to the characteristics of the option module and is linked to a controller via a communication signal path.

As shown in greater detail in FIG. 2, the identification storage components 140a–140n are coupled together via a communication bus 150 dedicated to transfer information between one or more of the identification storage components 140a–140n and a controller 160. The communication bus 150 is preferably a multiple wire bus propagating two or more bits concurrently but may be configured as a single wire bus supporting serial communication in which the identification storage components 140a–140n would support a serial output (e.g., a DC250x-UNW manufactured by Dallas Semiconductor Corporation of Dallas, Tex.). Preferably coupled to the motherboard, the controller 160 may include a micro-controller, a memory controller or any other type of controller device that can communicate with the identification storage components 140a–140n and software.

Figure 3:
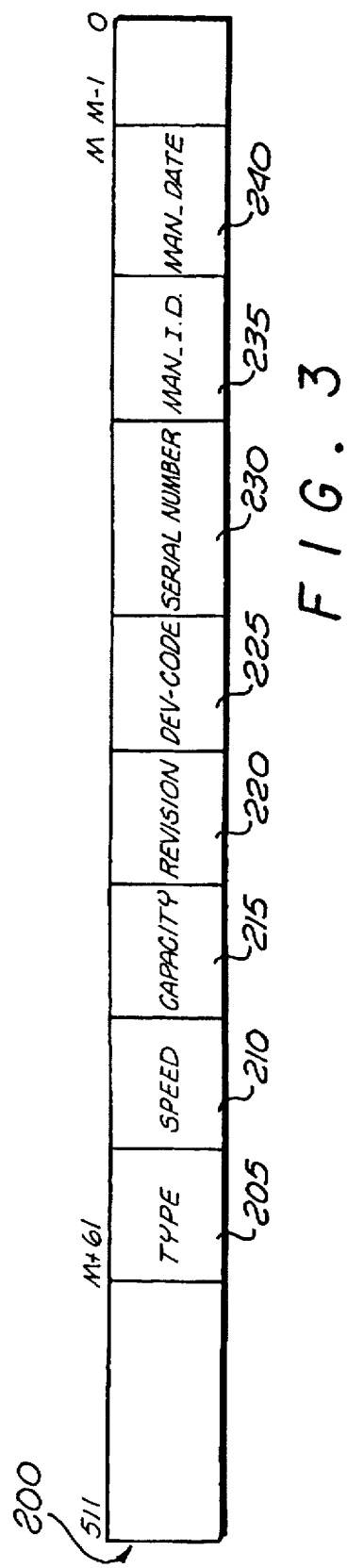
FIG. 3 is a more detailed block diagram of the information that may be exchanged between the identification storage component and the controller.

Referring now to FIG. 3, each of the identification storage components is shown with an ability to store a single 512-bit checksum protected word 200 although any word size may be used. Each word 200 is subdivided into a plurality of encoded fields, including but not limited to a "Type", "Speed", "Capacity", "Revision", "Dev_Code", "Serial Number", "Man_ID" and "Man_Date" fields. It is contemplated that the number and type of encoded fields depends on the amount and nature of information needed by the controller. Likewise, of the above-listed encoded fields, only some of which may be used to provide information to the controller.

The "Type" field 205 may be used to identify the functionality of the module. This field would be queried by software before use because the information contained in this field may assist in the interpretation of other fields and may cause software to perform different initialization functions. As featured in Table 1, the type field 205 may be configured as a 3-bit encoded value to denote the nature of the module to determine whether the option module has been incorrectly coupled to the sockets of the motherboard.

TABLE 1

| Type Field | |
|---|---|
| ENCODED VALUE | DESCRIPTION |
| 000 | DRAM Module |

TABLE 1-continued

| Type Field | |
|---|---|
| ENCODED VALUE | DESCRIPTION |
| 001 | NV RAM Module |
| 010 | Flash |
| 011 | I/O Module |
| 100 | Video Module |
| 101–111 | Other Module Types (TBA) |

Another encoded field is the "Speed" field 210 which, in its preferred embodiment, is 3-bits wide. The Speed field 210 provides information about the speed of the module (i.e., data transfer speed of its components) upon being queried before any attempts are made to utilize the module. Examples of possible encoded "speed" values utilized by a SIMM for example are shown in Table 2.

TABLE 2

| Speed Field | |
|---|---|
| ENCODED VALUE | DESCRIPTION |
| 000 | SIMM contains memory components operating at a speed of 60 nanoseconds ("ns"). |
| 001 | SIMM contains memory components operating at a speed of 50 ns. |
| 010 | SIMM contains memory components operating at a speed of 45 ns. |
| 011 | SIMM contains memory components operating at a speed of 40 ns. |
| 100 | SIMM contains memory components operating at a speed of 35 ns. |
| 101–111 | Other Speed Values (TBA) |

It is contemplated that the remaining encoded values may be used to denote faster or slower speed times for the memory components.

As shown in FIG. 3, the "Capacity" field 215 may be configured to be 4-bits wide. The Capacity field 215 is utilized to describe the storage capacity of the module which, like the Speed field 210, is queried by software before attempts are made to use the module. Examples of possible encoded "capacity" values, for example those utilized by a SIMM, are shown in Table 3 but it is contemplated that other Capacity values may be used depending on the nature of the option module.

TABLE 3

| Capacity Field | |
|---|---|
| ENCODED VALUE | DESCRIPTION |
| 000 | SIMM contains 16 megabytes ("MB") of memory. |
| 001 | SIMM contains 32 MB of memory. |
| 010 | SIMM contains 64 MB of memory. |
| 011 | SIMM contains 128 MB of memory. |
| 100 | SIMM contains 256 MB of memory. |
| 101–111 | Other Capacity Values |

Another encoded field of the word 200 may include the "Revision" field 220 which provides a revision level of the module. This enables a user to quickly determine without removal of the module from the motherboard as to whether substitution or additional modules are necessary to appropriately upgrade the computer system. As shown, the Revision field 220 is 3-bits wide but may be any chosen bit width can be used as for any of the encoded fields.

Referring still to FIG. 3, another possible encoded field may be the Device Code ("Dev_Code") field 225 which is a 4-bit field used to describe the architecture of certain electronic components of its module. This information may useful in a number of situations, such as to increase the effectiveness and efficiency of memory test algorithms. Examples of encoded "Dev_Code" values are shown in Table 4.

TABLE 4

Dev_Code Field

| ENCODED VALUE | ARCHITECTURE OF MEMORY COMPONENT |
| --- | --- |
| 0000 | 4MB × 4 |
| 0001 | 8MB × 8 |
| 0010 | 1MB × 16 |
| 0011 | 16MB × 4 |
| 0100–1111 | Other Architecture Schemes (TBA) |

Yet another encoded field included in the word 200 may be the "Serial Number" 230 field which could be used to contain a unique serial number/number(s) of the module/components for inventory and asset control. As a result, bar codes or serial numbers need not be attached to or imprinted on the module or components themselves. In addition, the chassis of the computer does not need to be opened. Rather, a software diagnostic program may be used to fetch this information in an appropriate format.

Other encoded fields may include a 3-bit manufacture identification ("Man_ID") field 235 and a date of manufacture ("Man_Date") field 240. The Man_ID field 235 is used to identify the manufacturer of the module. Such information is valuable during electronic component recalls and other situations where identifying the vendor is important. As shown below, Table 5 lists possible encoded "Man_ID" values identifying various electronic component manufacturers. Additionally, the "Man_Date" field 240 may be used to ascertain the date, week, month and/or year that module was made. This attribute could also be useful in electronic component recalls and the like.

TABLE 5

Manufacturer ID Field

| ENCODED VALUE | DESCRIPTION |
| --- | --- |
| 000 | NEC |
| 001 | Micron Technology |
| 010 | Texas Instruments |
| 011 | Mitsubishi |
| 100–111 | Other Manufacturers (TBA) |

Figure 4:
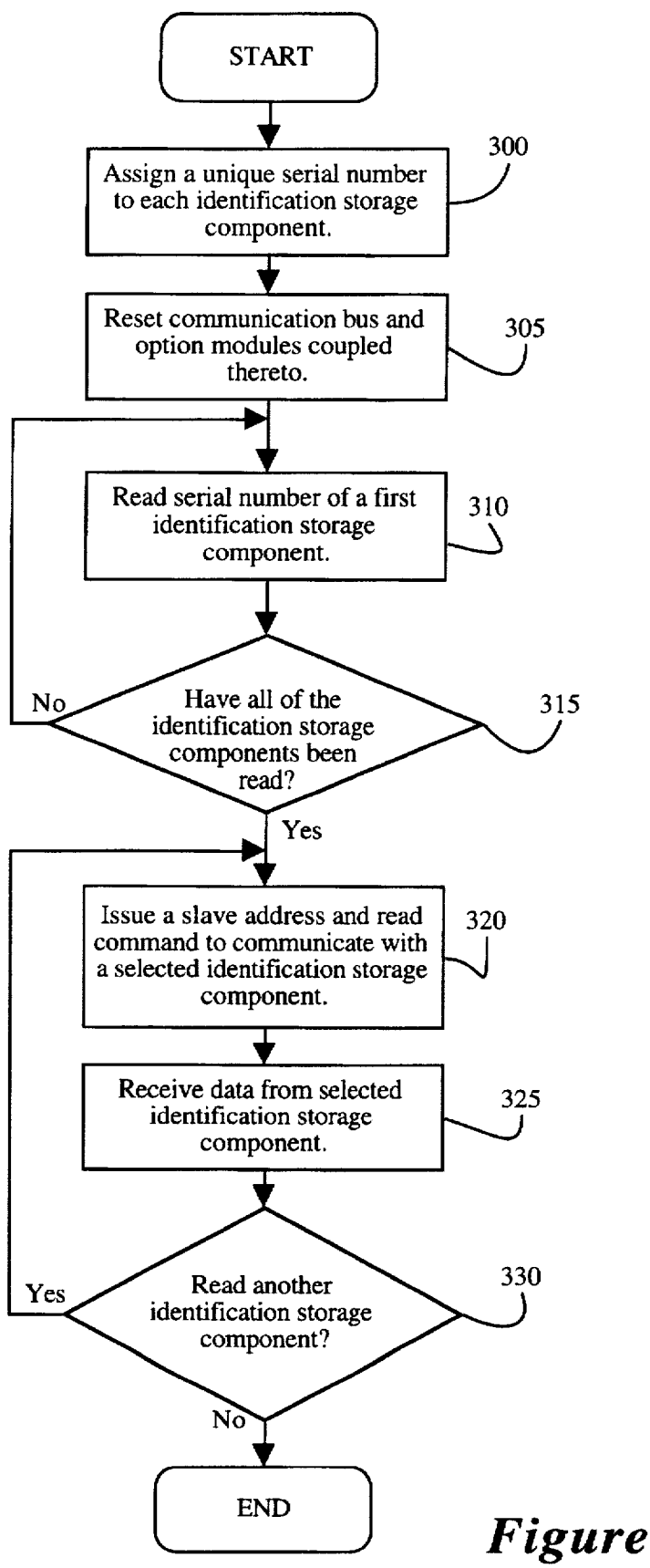
FIG. 4 is a flowchart of the operational steps performed by the controller and the identification storage components to take advantage of the identification interface.

Referring now to FIG. 4, the communication scheme used by the identification interface is shown below. Basically, as mentioned above, the identification storage components, operating as "slave" devices, implemented onto each of the option modules is assigned a serial number to be used as its unique address (Step 300). A controller operating as a "master" device for the identification interface, namely memory controller which can be accessed by firmware, initially resets the communication bus as well as the option modules coupled thereto (Step 305). Next, since all of the identification storage components are electrically coupled to the communication bus, the controller would read the unique serial number of a first identification storage component coupled to the communication bus (Step 310). The serial number is used as its address. This process would continue until all of the identification storage components are identified (Step 315).

Thereafter, the controller issues a read command along with or prior to the address of a particular identification storage component. All of the other identification storage components will be electrically disconnected from the communication bus at this point since the address is unique (Step 320). The controller can now receive data and communicate with that particular identification storage component (Step 325). Thereafter, a check is made whether the user (or controller) desires access to another identification storage component and if so, the above-described process is repeated (Step 330).

To one skilled in the art, alternative embodiments of the invention will be apparent. The preferred embodiment provided is merely for illustrative purposes and should not be taken as limiting the scope of the invention as claimed.

What is claimed is:

1. A computer system comprising:
   a motherboard including a controller; and
   a plurality of option modules coupled to said motherboard, each of said plurality of option modules includes an identification storage component containing a plurality of encoded fields, the plurality of encoded fields includes a first field providing a type value to indicate a type of operation performed by an option module associated with the identification storage component; and
   a communication bus dedicated to transfer contents of the plurality of encoded fields from each of said plurality of identification storage components to said controller.

2. The computer system according to claim 1, wherein at least one of said plurality of option modules is a memory module.

3. The computer system according to claim 1, wherein each of said identification storage components is a flash memory device.

4. The computer system according to claim 1, wherein said information contained by each of said identification storage components includes a speed value to indicate a speed grade of at least one electronic component of its associated option module.

5. The computer system according to claim 1, wherein at least one of said plurality of option modules is either a video module or a processor module.

6. The computer system according to claim 1, wherein each of said identification storage components contains an encoded field providing a revision value to identify a revision number of its associated option module.

7. The computer system according to claim 1, wherein each of said identification storage components contains an encoded field providing a manufacture identification to identify either the manufacturer of its associated option module or a manufacturer of electronic components forming said associated option module.

8. The computer system according to claim 2, wherein each of said identification storage components contains an encoded field providing a capacity value to indicate a storage capacity of its associated option module.

9. The computer system according to claim 1, wherein said communication bus is serial to transfer said information to said controller one-bit at a time.

10. The computer system according to claim 1, wherein said controller is a memory controller.

11. An identification interface configured to identify functional characteristics of a printed circuit board by providing a controller access to a plurality of bit fields contained on an on-board identification storage component, comprising:

a first bit field having at least one bit to indicate a speed grade of components coupled to the printed circuit board; and a second bit field having at least one bit to indicate a type of operation performed by the printed circuit board.

12. The identification interface according to claim 11 further comprising a third bit field having at least one bit to indicate the manufacturer of the printed circuit board.

13. The identification interface according to claim 12, wherein the third bit field alternatively is used to identify a manufacturer of an electronic component implemented on the printed circuit board.

14. The identification interface according to claim 11, wherein the type of operation is a memory operation indicating that the printed circuit board is a memory board.

15. The identification interface according to claim 14 further comprising a fourth bit field having at least one bit to identify a revision number of the printed circuit board.

16. The identification interface according to claim 15 further comprising a fifth bit field having at least one bit to indicate a storage capacity of the printed circuit board.

17. A method for electrically transferring control information from a first identification storage component of a plurality of identification storage components, implemented on an option card to a controller of a computer via a communication bus, the method comprising the steps of:

assigning each of the plurality of identification storage components a unique serial number;

reading the serial number of each of the plurality of identification storage components by the controller;

issuing a read command and the serial number of a selected identification storage component; and transmitting data pertaining to characteristics of the option module from said selected identification storage component to the controller, the characteristics include a type of operation performed by the selected identification storage component.

18. The method according to claim 17, wherein said data transmitted to the option module include a plurality of bits identifying a manufacturer of the option module.

19. An identification interface configured to identify functional characteristics of an option module by providing access to a plurality of bit fields contained in an identification storage component on the option module, the identification interface comprising:

a first bit field to provide information about a first characteristic of the option module; and a second bit field to provide information about a type of operation performed by the option module.

20. The identification interface according to claim 19, wherein the first bit field indicates a speed grade of at least one component coupled to the option module.

21. The identification interface according to claim 19, further comprising a third bit field indicating a manufacturer of the option module, and alternatively, a manufacturer of at least one component implemented on the option module.

22. The identification interface according to claim 21, further comprising a fourth bit field indicating a type of operation supported by the option module, the type of operation including one of at least a memory, input/output and video operation.

* * * * *